April 17, 1956 W. P. MASON 2,742,614
ELECTROMECHANICAL TRANSDUCER AND SYSTEMS
Filed April 29, 1953

INVENTOR
W. P. MASON
BY
*Hugh S. Wertz*
ATTORNEY ns # United States Patent Office 2,742,614
Patented Apr. 17, 1956

2,742,614

ELECTROMECHANICAL TRANSDUCER AND SYSTEMS

Warren P. Mason, West Orange, N. J., assignor to Bell Telephone Laboratories, Incorporated, New York, N. Y., a corporation of New York Application April 29, 1953, Serial No. 351,841

6 Claims. (Cl. 333—30)

This invention relates to electromechanical transducers and mechanical wave circuits and more particularly to transducers and circuits that are torsionally excited and to methods of constructing such transducers.

An object of this invention is to improve the efficiency of electromechanical devices.

Another object is to simplify the manufacture and reduce the cost of these devices.

A further object is to improve the filtering characteristics of electromechanical filters.

For many years the fact has been recognized that it is advantageous for certain low frequency communication uses to employ, instead of a wholly electrical device such as a frequency filter or a delay line, an electrically equivalent device which includes a mechanically vibrating element and a transducer to convert between electrical and mechanical wave energy. The advantages resulting from this substitution are primarily a substantial economy in space required and a noticeable saving in cost to manufacture, although in certain instances the electrical characteristics of these partly mechanical units are actually superior to the characteristics of their electrical counterparts costing many times as much. Serious limitations to the usefulness of these electromechanical devices, however, result from the generally low conversion efficiency of the component transducers and from the frequent necessity of forming the transducers and the mechanically vibrating elements separately. The present invention is directed toward the elimination of these limitations by means which are inexpensive and which have high efficiency and temperature stability.

In accordance with the present invention, a long thin rod of a ferroelectric material such as barium titanate is arranged for use as a torsionally excited electromechanical device by polarizing in a particular way the particles in the two end sections of the rod and then by applying signal electrodes to the surface of the rod in the vicinity of this polarization. An electric signal applied to these electrodes is then able to produce a mechanical shearing force which results in torsional mechanical vibrations corresponding to the signal.

A more complete understanding, however, of the general nature of this invention will best be gained from a study of the following description given in connection with the accompanying drawings, in which.

Figure 1:
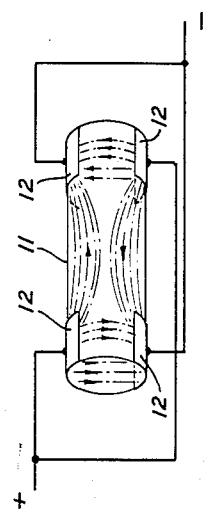
Fig. 1 shows an illustrative poling electrode arrangement for a torsional mode ferroelectric transducer.

Referring now more particularly to the drawings, Fig. 1 shows, for purposes of illustration, a solid cylinder 11 of ferroelectric material having four electrodes or poles 12 symmetrically applied to its ends as shown. Opposite poles are criss-cross connected to opposite terminals of a direct potential source so that the electric field which may exist between them within the material will be substantially as indicated by the dotted arrows shown. The area covered by poles 12 is not critical but in a model which has been built and tested each extends in width approximately a quarter way around the circumference of cylinder 11 and for a length along the axis of the cylinder that is roughly equal to the width. The length of cylinder 11 is preferably a half wavelength long at the frequency of operation and its diameter is preferably, but not necessarily, chosen equal to the diameter of the mechanical element to be used in conjunction with the transducer.

Since poles 12 serve solely in aid of properly orienting the ferroelectric particles, or domains, within cylinder 11, they should be applied in such fashion that they may easily be removed after poling has been accomplished. The electric potential applied between pairs of poles depends upon their separation and upon the ease with which the ferroelectric particles can be oriented. Simultaneously with the application of this voltage, the material of cylinder 11 is heated above its Curie point, that is, the temperature above which the material ceases to be ferroelectric, in order to facilitate aligning the particles with the electric field. For a ceramic composed of more than 80 per cent barium titanate ($BaTiO_3$), a field strength of approximately 30 volts/mil of electrode separation above the Curie point, which is about 130° C., has been found satisfactory. When the particles have been aligned by this method, the ferroelectric material is then slowly cooled with the electric field still applied until approximately room temperature is reached. Poles 12 may then be removed and driving electrodes applied to the cylinder.

Figure 2:
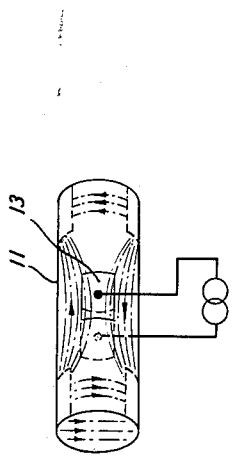
Fig. 2 shows a driving electrode arrangement for such a transducer.

Fig. 2 shows, by way of example, cylinder 11 with poles 12 removed and with driving electrodes 13 in place. Assuming that the lines of particle orientation correspond with the dotted arrows in Fig. 1, each of signal electrodes 13 is applied to the cylinder so that it is symmetrically located with respect to these lines. Accordingly, electrodes 13 are placed on opposite sides of cylinder 11 equally distant from the former positions of poles 12 indicated by the dotted lines in Fig. 2 and displaced angularly therefrom by 90 degrees. The length of electrodes 13 should be roughly equal to the length of poles 12 and their combined width should cover from 30 to 80 per cent of the circumference of the cylinder depending upon the shunt capacity desired. These electrodes are preferably, but not necessarily, deposited upon cylinder 11 by evaporation, since it is desirable to keep their mass and mechanical losses as low as possible.

Figure 3:
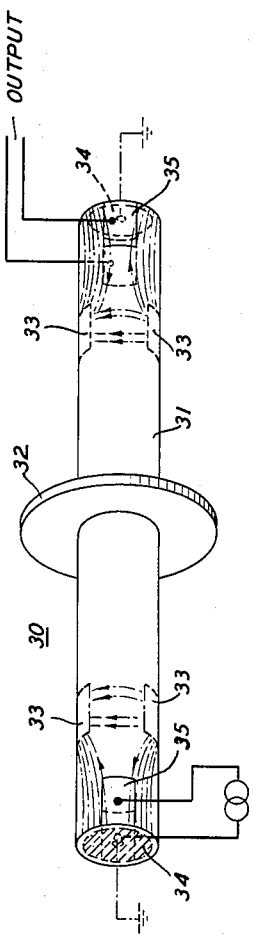
Fig. 3 shows an electromechanical frequency filter in which an input and output transducer made according to the present invention are formed as an integral part of a mechanical wave filter.

Fig. 3 is an illustrative embodiment of an electromechanical wave filter 30 of integral structure comprising a long thin rod 31 having a centrally located disk 32 positioned midway between its ends, both rod and disk being formed from the same piece of ferroelectric material. In order to provide the necessary input and output transducers, the two end sections of the filter are polarized substantially as described in connection with the transducer in Figs. 1 and 2. Here, however, an alternative poling electrode arrangement consisting of poles 33 and plates 34 is used to provide the necessary longitudinal bidirectional electric field such as exists midway between the ends of cylinder 11 in Fig. 1. After the ferroelectric particles have been permanently polarized along these lines of force, the poling electrodes are removed and signal electrodes 35 applied in pairs to the two ends of the rod. In general, to obtain maximum amplitude ferroelectric vibrations the signal voltage applied to excite the ferroelectric particles should be applied at right angles to their polarization. In the embodiment shown here, for efficient conversion of electrical energy into torsional vibrations, signal voltage should be applied symmetrically at right angles to the bidirectional longitudinal polarization. Accordingly, electrodes 35 are applied on opposite sides of the rod at the ends thereof over areas which are displaced 90 degrees from the areas covered by poles 33. The size of these electrodes is not critical and may be determined as explained previously in connection with electrodes 13.

When an electric signal is applied to a pair of electrodes 35, symmetrical ferroelectric particle expansion or contraction, as the case may be, produces a shearing force across the rod which in turn produces torsional vibrations. These vibrations, having a frequency and amplitude corresponding to the signal, may then travel down the rod to the other end thereof being attenuated or not, as the case may be, by the filtering action of disk 32. Any vibrations which reach the other end are converted back into electrical energy by the reciprocal action of the ferroelectric particles at that end.

The foregoing description is intended to be in illustration of the general nature and objects of this invention and not as a complete exposition of all possible embodiments thereof. It should be understood in particular that these general principles may be applied to variously shaped structures made of any of numerous ferroelectric materials, and that poling or driving electrode configurations are not limited solely to those which have been shown. Changes or modifications in the embodiments illustrated herein will occur to those skilled in the art and may be made without departing from the spirit or scope of this invention.

What is claimed is:

1. In an electromechanical system for securing interaction between electrical and mechanical energy, a one piece solid, member of ferroelectric material for transmitting torsional mechanical vibrations, the length of said member substantially exceeding its maximum transverse dimension, one end of said member for a length several times the maximum transverse dimension of said member, being polarized in opposite directions with respect to a substantially median longitudinal plane through said member, and a pair of electrodes attached to opposite sides of said member at a position of substantially maximum bidirectional polarization of said member, said electrodes being substantially normal to said longitudinal plane whereby torsional vibrations in said member will generate a corresponding electrical voltage across said electrodes and an electrical signal applied to said electrodes will generate corresponding torsional vibrations in said member.

2. In an electromechanical device, a thin rod-like solid member of ferroelectric material having a length several times its maximum transverse dimension and having within it a first region of polarized particles polarized in one direction parallel to the longitudinal axis of said member and a second region of polarized particles polarized in the other direction parallel to the longitudinal axis of said member, said regions having a longitudinal dimension several times the maximum transverse dimension of said member and being immediately adjacent and longitudinally substantially coextensive with each other on opposite sides of a substantially median longitudinal plane of said member, and a pair of signal electrodes placed in integral contact with the surface of said member on opposite sides thereof and symmetrically at right angles to said longitudinally polarized regions, whereby torsional mechanical vibrations are produced in accordance with a signal voltage applied to said signal electrodes.

3. In an electromechanical device, an elongated rod-like solid member of ferroelectric material having a length many times its maximum cross-sectional dimension and having near each end thereof a region of longitudinal bidirectional particle polarization, the length of said region being several times the maximum cross-sectional dimension of said member, the polarization being in one direction on one side of a substantially median longitudinal plane through said member and in the opposite direction on the other side of said plane, and means for impressing a variable electric field through each of said regions, normal to said polarizations and substantially parallel to said median plane, whereby torsional mechanical vibrations corresponding to an electrical signal applied to said impressing means at one end of said device may be transmitted along said member to the other end and be reconverted to said applied electrical signal at said other end.

4. The combination of elements as in claim 3 in which said rod-like member is cylindrical in shape.

5. The combination of elements as in claim 3 in which said ferroelectric material comprises barium titanate.

6. The combination of elements as in claim 3 in which said means for impressing a variable electric field includes electrodes applied over areas of the surface of said rod-like member on opposite sides thereof symmetrically over the regions of particle polarization so that the electric field which may exist between said electrodes will be at right angles to the directions of said polarization.

References Cited in the file of this patent

UNITED STATES PATENTS

| 1,861,862 | Hund | June 7, 1932 |
| 1,899,503 | Hansell | Feb. 28, 1933 |
| 1,975,517 | Nicolson | Oct. 2, 1934 |
| 2,607,216 | Mason | Aug. 19, 1952 |
| 2,625,663 | Howatt | Jan. 13, 1953 |